(12) United States Patent
Zejda et al.

(10) Patent No.: US 11,204,747 B1
(45) Date of Patent: Dec. 21, 2021

(54) RE-TARGETABLE INTERFACE FOR DATA EXCHANGE BETWEEN HETEROGENEOUS SYSTEMS AND ACCELERATOR ABSTRACTION INTO SOFTWARE INSTRUCTIONS

(71) Applicant: Xilinx, Inc., San Jose, CA (US)

(72) Inventors: Jindrich Zejda, Saratoga, CA (US); Elliott Delaye, San Jose, CA (US); Yongjun Wu, Cupertino, CA (US); Aaron Ng, San Jose, CA (US); Ashish Sirasao, San Jose, CA (US); Khang K. Dao, San Jose, CA (US); Christopher J. Case, San Jose, CA (US)

(73) Assignee: XILINX, INC., San Jose, CA (US)

( * ) Notice: Subject to any disclaimer, the term of this patent is extended or adjusted under 35 U.S.C. 154(b) by 537 days.

(21) Appl. No.: 15/786,395

(22) Filed: Oct. 17, 2017

(51) Int. Cl.
| | |
|---|---|
| *G06F 9/45* | (2006.01) |
| *G06F 8/41* | (2018.01) |
| *G06N 3/02* | (2006.01) |
| *G06F 13/28* | (2006.01) |
| *G06F 8/30* | (2018.01) |
| *G06F 9/451* | (2018.01) |
| *G06F 9/50* | (2006.01) |
| *G06F 13/362* | (2006.01) |

(52) U.S. Cl.
CPC ............ *G06F 8/47* (2013.01); *G06F 8/315* (2013.01); *G06F 8/447* (2013.01); *G06F 9/451* (2018.02); *G06F 9/5038* (2013.01); *G06F 13/28* (2013.01); *G06N 3/02* (2013.01); *G06F 13/362* (2013.01)

(58) Field of Classification Search
CPC ........ G06F 17/5027; G06F 8/34; G06F 8/447; G06F 8/315; G06F 13/362; G06F 13/28; G06F 9/451; G06F 9/5038; G06F 8/47; G06N 7/005; G06N 3/08
See application file for complete search history.

(56) References Cited

U.S. PATENT DOCUMENTS 6,009,256 A * 12/1999 Tseng ............... G06F 17/5027
703/13
6,346,825 B1 2/2002 Pang et al.
(Continued)

OTHER PUBLICATIONS

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.
(Continued)

*Primary Examiner* — Tuan A Vu
(74) *Attorney, Agent, or Firm* — Patterson + Sheridan, LLP

(57) ABSTRACT

Embodiments herein describe techniques for interfacing a neural network application with a neural network accelerator that operate on two heterogeneous computing systems. For example, the neural network application may execute on a central processing unit (CPU) in a computing system while the neural network accelerator executes on a FPGA. As a result, when moving a software-hardware boundary between the two heterogeneous systems, changes may be made to both the neural network application (using software code) and to the accelerator (using RTL). The embodiments herein describe a software defined approach where shared interface code is used to express both sides of the interface between the two heterogeneous systems in a single abstraction (e.g., a software class).

20 Claims, 12 Drawing Sheets

(56) References Cited

U.S. PATENT DOCUMENTS

| | | | | |
|---|---|---|---|---|
| 2002/0080174 | A1* | 6/2002 | Kodosky | G06F 8/34 |
| | | | | 715/762 |
| 2004/0088685 | A1* | 5/2004 | Poznanovic | G06F 8/447 |
| | | | | 717/140 |
| 2007/0288892 | A1* | 12/2007 | Foti | G06F 8/315 |
| | | | | 717/114 |
| 2013/0055066 | A1* | 2/2013 | Draper | G06F 9/451 |
| | | | | 715/234 |
| 2018/0004693 | A1* | 1/2018 | MacNamara | G06F 13/28 |
| 2018/0046913 | A1* | 2/2018 | Yu | G06N 3/08 |
| 2018/0089119 | A1* | 3/2018 | Khan | G06F 13/362 |
| 2018/0240032 | A1* | 8/2018 | van Rooyen | G06N 7/005 |
| 2018/0276044 | A1* | 9/2018 | Fong | G06F 9/5038 |

OTHER PUBLICATIONS

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institure of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://betewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

* cited by examiner

RE-TARGETABLE INTERFACE FOR DATA EXCHANGE BETWEEN HETEROGENEOUS SYSTEMS AND ACCELERATOR ABSTRACTION INTO SOFTWARE INSTRUCTIONS

TECHNICAL FIELD

Examples of the present disclosure generally relate to communication between heterogeneous systems using a re-targetable interface.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

A modern field programmable gate array (FPGA) provides millions of look up tables and thousands of digital signal processing (DSP) and random access memory blocks (BRAM) that can be utilized to create massively parallel hardware systems. The programmable logic in the FPGA can form one or more kernels which can execute accelerators (also referred to as acceleration circuits) using the parallel hardware systems.

An application executing in a host computing system can transmit jobs or tasks to the accelerator on the FPGA. To do so, both the host computing system and the FPGA have respective software and hardware interfaces for facilitating the exchange of data between the two heterogeneous systems. However, the configuration of the application on the host and the accelerator on the FPGA usually changes throughout development. Rather than changing the hardware-software boundary—e.g., changing which tasks are performed by the host and which are performed by the FPGA—rigid specifications such as a hardware defined accelerator (e.g., register transfer logic (RTL)) can set a fixed hardware-software boundary between the application and the accelerator. In this example, the boundary includes a fixed application specific interface (API) and a set of hardware resources such as registers with fixed addresses. Implementing changes tend to be both tedious and error prone since any change to the software side (e.g., the application) made by a software developer need to be mirrored on the hardware side (e.g., the accelerator) in RTL. Thus, when a software developer changes the application, she must wait until someone proficient in RTL can change the configuration of the accelerator in order to update the system.

SUMMARY

Techniques for exchanging data between a plurality of heterogeneous systems are described herein. One example is a method that includes receiving shared interface code comprising a data structure defining a software-hardware boundary between the plurality of heterogeneous computing systems, compiling the shared interface code to generate a first interface for a first computing system of the plurality of heterogeneous computing systems, compiling the shared interface code to generate a second interface for a second computing system of the plurality of heterogeneous computing systems, and exchanging data between the first and second computing systems using the first and second interfaces.

Another example is a non-transitory computer-readable storage medium storing instructions, which when executed on one or more processing devices, perform an operation for exchanging data between a plurality of heterogeneous systems. The operation includes receiving shared interface code comprising a data structure defining a software-hardware boundary between the plurality of heterogeneous computing systems, compiling the shared interface code to generate a first interface for a first computing system of the plurality of heterogeneous computing systems, compiling the shared interface code to generate a second interface for a second computing system of the plurality of heterogeneous computing systems, and exchanging data between the first and second computing systems using the first and second interfaces.

Another example is a first computing system comprising a processor and a compiler, wherein the compiler is configured to receive shared interface code comprising a data structure defining a software-hardware boundary between the plurality of heterogeneous computing systems, compile the shared interface code to generate a first interface for the first computing system, and compile the shared interface code to generate a second interface for a second computing system of the plurality of heterogeneous computing systems. Moreover, the first and second computing systems are configured to exchange data using the first and second interfaces.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
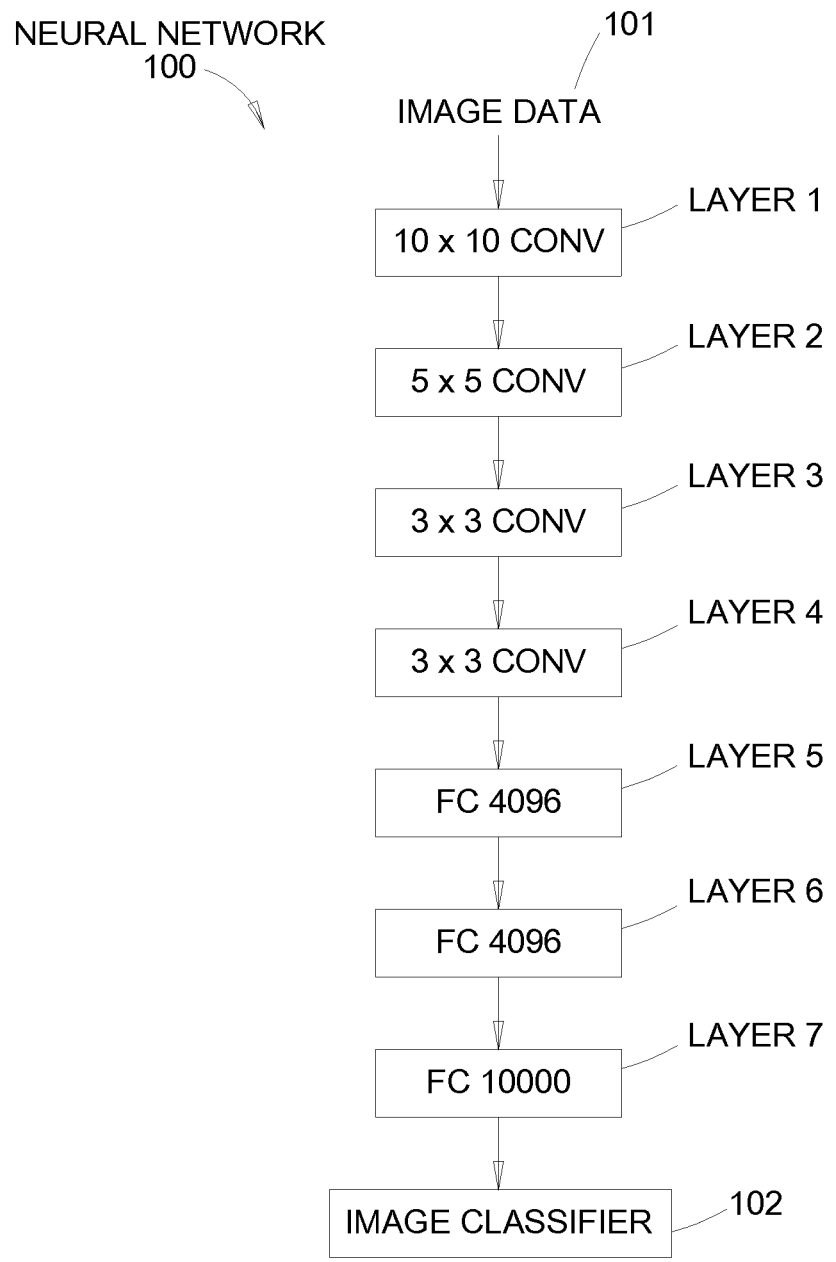
FIG. 1 illustrates a multi-layer neural network, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for interfacing a neural network application with a neural network accelerator that operate on two heterogeneous computing systems—i.e., two different types of computing systems. For example, the neural network application may execute on a central processing unit (CPU) in a computing system while the neural network accelerator executes on a FPGA. As a result, when moving the software-hardware boundary between the two heterogeneous systems, changes may be made to both the neural network application (using software code) and the accelerator (using RTL). Because coding using software code and RTL are very different and require specialized knowledge, many software developers may not have the requisite knowledge to mirror any changes made in the neural network application to the accelerator.

The embodiments herein describe a software defined approach that uses shared interface code to express both sides of the interface between the two heterogeneous systems in a single abstraction (e.g., a software class). In one embodiment, the shared interface code automates data exchange between the systems and abstracts the accelerator behavior into assembly like instructions. A software developer can change the boundary between the neural network application and the neural network accelerator by adding or removing class or data members from the shared interface code.

A compiler can compile the shared interface code into a first interface for the neural network application (which can be executed by the CPU) and a second interface for the neural network accelerator (which can be executed by hardware in the FPGA). The neural network application and the neural network accelerators can use the respective interfaces to communicate across the boundary.

FIG. 1 illustrates a multi-layer neural network 100, according to an example. As used herein, a neural network 100 is a computational module used in machine learning and is based on a large collection of connected units called artificial neurons where connections between the neurons carry an activation signal of varying strength. The neural network 100 can be trained from examples rather than being explicitly programmed. In one embodiment, the neurons in the neural network 100 are connected in layers—e.g., Layers 1, 2, 3, etc.—where data travels from the first layer—e.g., Layer 1—to the last layer—e.g., Layer 7. Although seven layers are shown in FIG. 1, the neural network 100 can include hundreds or thousands of different layers.

Neural networks can perform any number of tasks such as computer vision, feature detection, speech recognition, and the like. In FIG. 1, the neural network 100 detects features in a digital image such as classifying the objects in the image, performing facial recognition, identifying text, etc. To do so, image data 105 is fed into the first layer in the neural network which performs a corresponding function, in this example, a 10×10 convolution on the image data 105. The results of that function is then passed to the next layer—e.g., Layer 2—which performs its function before passing the processed image data to the next level, and so forth. After being processed by the layers, the data is received at an image classifier 110 which can detect features in the image data.

The layers are defined in a sequential order such that Layer 1 is performed before Layer 2, Layer 2 is performed before Layer 3, and so forth. Thus, there exists a data dependency between the lower layers and the upper layer(s). Although Layer 2 waits to receive data from Layer 1, in one embodiment, the neural network 100 can be parallelized such that each layer can operate concurrently. That is, during each clock cycle, the layers can receive new data and output processed data. For example, during each clock cycle, new image data 105 can be provided to Layer 1. If the layers are implemented in hardware to form a parallelized pipeline, after seven clock cycles, each of the layers operates concurrently to process the part of image data. The "part of image data" can be an entire image, a set of pixels of one image, a batch of images, or any amount of data that each layer can process concurrently.

Figure 2:
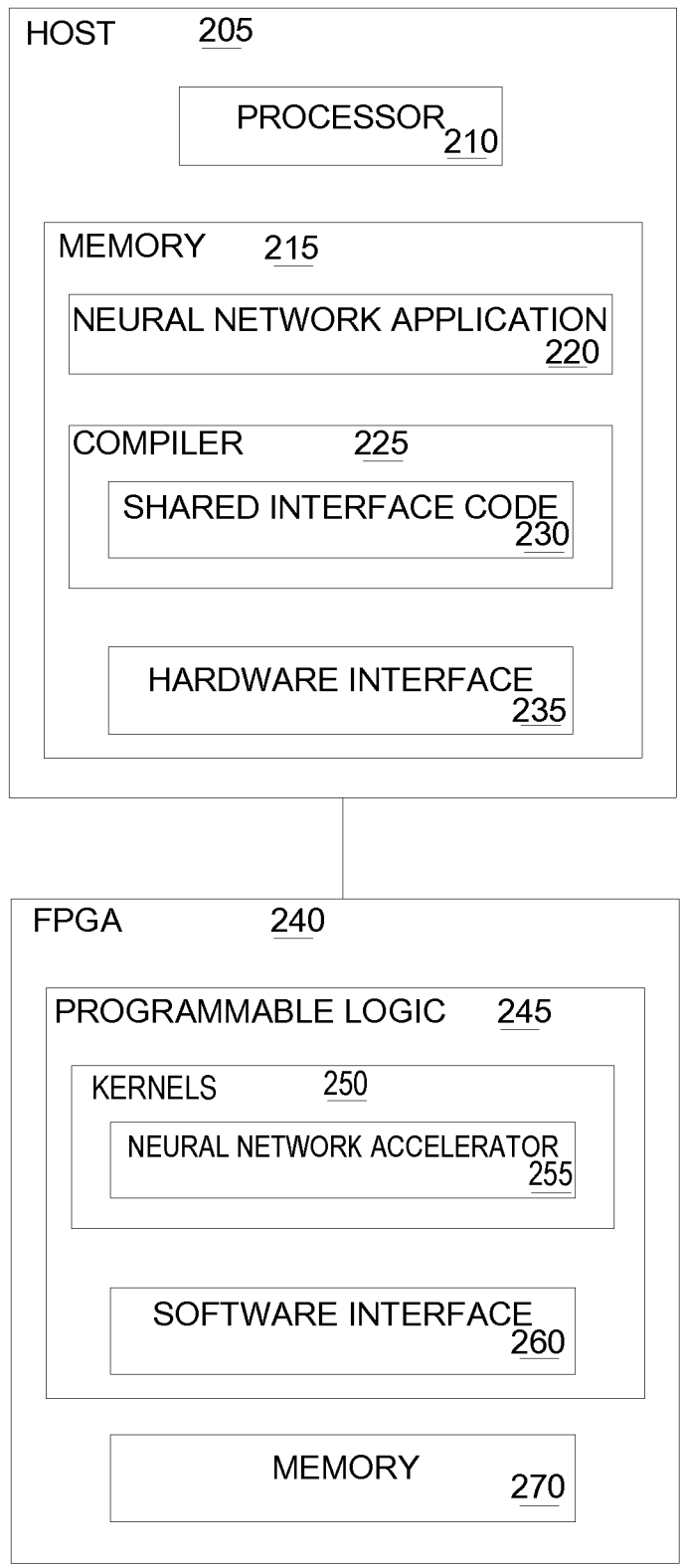
FIG. 2 is a system for interfacing a neural network accelerator with a neural network application, according to an example.

FIG. 2 is a communication system 200 for interfacing a neural network accelerator 255 (e.g., an acceleration circuit or kernel acceleration circuit) with a neural network application 220, according to an example. The system 200 includes a host 205 (e.g., one or more desktop computers, servers, blades, and the like) and an FPGA 240. The host 205 includes a processor 210 which represents any number of processing elements which each can contain any number of processing cores. The host 205 also includes a memory 215 which can have volatile or non-volatile memory elements.

The memory 215 includes a neural network application 220, a compiler 225, and a hardware interface 235. The neural network application 220 in one embodiment is a software application executed by the processor 210; however, in other examples, the neural network application 220 can include hardware elements. The neural network application 220 establishes a neural network—e.g., the neural network 100 shown in FIG. 1—which can have any number of layers that perform different functions—e.g., convolution, Max-pooling, im2col, matrix multiplication, and the like. Although not shown, the neural network application 220 can use the neural network to process data (e.g., image or audio data) stored in the memory 215 or from external sources. For example, the host 205 may be communicatively coupled to a web portal that permits users to submit images that are then processed by the neural network application 220. The neural network application 220 is shown as an example of using the proposed interface, but the interface is applicable to any compute intensive application that requires use of heterogeneous compute systems such as CPU, GPU, FPGA, coprocessor, embedded processor, etc.

In the embodiments that follow, the neural network application 220 is communicatively coupled to the neural network accelerator 255 on the FPGA 240 which may improve the performance of the neural network—e.g., enable the neural network to execute the plurality of layers quicker relative to relying solely on the processor 210. However, the neural network application 220 may processes data differently than the neural network accelerator 255.

The hardware interface 235 enables the neural network application 220 (and the host 205 generally) to communicate with the FPGA 240 and the neural network accelerator 255. In one embodiment, the hardware interface 235 includes a library for transmitting data and instructions received from the neural network application 220 to the neural network accelerator 255. The library may include functions for transforming the data received from the neural network application into a serialized bit stream which is then transmitted to the FPGA 240.

In one embodiment, the hardware interface 235 (or a least a portion thereof) is generated by the compiler 225 compiling the shared interface code 230. Put differently, the compiler 225 may compile the shared interface code 230 to generate object code representing the hardware interface 235 which, when executed by the processor 210, performs the functions described above. In one embodiment, the shared interface code 230 contains high-level code which defines both sides of the host-accelerator interface as a single abstraction. In one embodiment, the high-level code may be a C++ class although this is just one example. The shared interface code 230 can be expressed using other types of high-level code or using a proprietary or unique code which is developed specifically for generating the shared interface code 230. In any case, the high-level code used in the shared interface code 230 may be easily understood by a software developer who programs the neural network application 220. Thus, the software developer can change the shared interface code 230 to adjust the hardware-software boundary between the neural network application 220 (e.g., a software application) and the neural network accelerator 255 (e.g., a hardware application) without being proficient in the hardware description language used to configure the FPGA.

When compiling the shared interface code 230, the compiler 225 can update the hardware interface 235 on the host 205 as well as a software interface 260 on the FPGA 240. In this manner, the software developer can change the shared interface code 230 which the compiler 225 uses to generate both the hardware interface 235 and the software interface 260. Advantageously, the software developer does not need to understand the hardware language (e.g., RTL) used to implement the software interface 260 in order to change the software-hardware boundary established by the hardware interface 235 and the software interface 260.

Although one compiler 225 is shown, in another embodiment, the host 205 can include two separate compilers—one compiler for converting the shared interface code 230 into object code that is executable by the processor 210 and another compiler for converting the shared interface code 230 into a hardware language for configuring the FPGA 240 (e.g., RTL). In one embodiment, the compiler includes a high level synthesis (HLS) compiler that converts source code of the shared interface code 230 such as C or C++ into RTL code which configures programmable logic 245 in the FPGA 240. In this manner, the compiler 225 (or multiple compilers) can compile the shared interface code 230 to create both interfaces for exchanging data between the host 205 and the FPGA 240.

The FPGA 240 includes the programmable logic 245 and memory 270. The programmable logic 245 can include an array of programmable logic blocks and a hierarchy of reconfigurable interconnects that enable the logic blocks to be communicatively coupled. The programmable logic 245 includes one or more kernels 250 which each can contain a neural network accelerator 255. In one example, the neural network accelerators 255 include digital signal processing (DSP) blocks which are useful when performing convolutions for the neural network application 220. In another embodiment, the accelerator 255 converts received image data into a 2D matrix (referred to as im2col) so that matrix multiplication can be used to perform convolution. However, the neural network application 220 can offload other types of neural network function to the neural network accelerator 255 such as Max-pooling which amplifies features in the image so the features are not lost when the image is scaled, a rectified linear unit (ReLU) which is an activation function or ramp function, and the like.

The programmable logic 245 also includes the software interface 260 which permits the neural network accelerator 255 (and more generally the FPGA 240) to transmit data to the host 205 and the neural network application 220. Like the hardware interface 235, the software interface 260 (or at least a portion thereof) is generated from compiling the shared interface code. However, unlike the hardware interface 235, the software interface 260 may be configured using a hardware description language implemented using the programmable logic 245 rather than software (e.g., object code). In one embodiment, the software interface 260 can serialize the data transmitted from the FPGA 240 to the host 205.

The memory 270 in the FPGA 240 can include volatile and non-volatile memory elements such as DDR ram, BRAM, or registers. In one embodiment, the hardware interface 235 can transmit serialized data to the FPGA 240 which is stored in the memory 270 as binary images. The neural network accelerator 255 can retrieve this data in order to perform a function or task as part of executing the neural network.

Although FIG. 2 illustrates communication between a host 205 and the FPGA 240 the embodiments are not limited to such. For example, using the shared interface code 230 to move a hardware-software boundary can be applied to other types of heterogeneous system such as communication between the host 205 and a graphic processing unit (GPU) or a digital signal processor which perform their functions using fixed or configurable hardware units rather than a general purpose processor 210 that executes software applications. Moreover, the shared interface code 230 can be used with other types of accelerators besides a neural network accelerator. For example, the shared interface code 230 can define a software-hardware boundary between a graphics application and a graphics accelerator or between an encryption application and a cryptographic accelerator.

Figure 3:
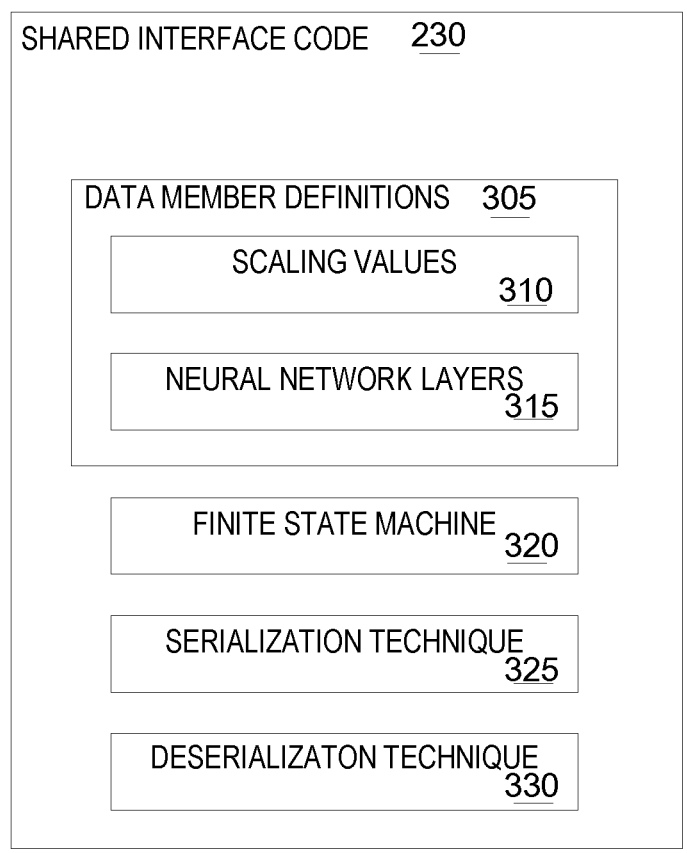
FIG. 3 illustrates various components in shared interface code, according to an example.

FIG. 3 illustrates various components in the shared interface code 230, according to an example. In one embodiment, the shared interface code 230 is a user defined data structure (e.g., a class) that has data and/or functions as its members. In one embodiment, the data structure or class defined by the shared interface code 230 is a re-targetable class which is portable for multiple heterogeneous systems. Put differently, in one embodiment, the shared interface code 230 is generic and is independent of the specific system architecture of the heterogeneous systems which may all be different.

As shown, the code 230 includes data member definitions 305 which define the data members in the data structure. The data member definitions 305 include accelerator control parameters such as scaling values 310 (e.g., data) used to execute the neural network as well as neural network layers 315 (e.g., functions). The neural network layers 315 may include instructions for executing the layers in the neural network. For example, the neural network layers 315 may define a pipeline used when executing the layers or whether ReLU is active or inactive.

In one embodiment, the software developer changes the data member definitions 305 when modifying the software-hardware boundary between the host and the FPGA. Doing so changes which tasks are performed (and how those tasks are performed) by the software—e.g., the neural network application—and which task are performed by the hardware—e.g., the neural network accelerator. For example, the software developer may add or remove data members or change how the functions defined by the data members operate. When creating a neural network, the software developer may update the data member definitions 305 frequently. Nonetheless, using the embodiments described herein, the software view from the host and the hardware view from the accelerator remain fully consistent as the boundary changes. This means that after changing the interface specification, the data sent by one system (e.g., the host) matches what the other system (e.g., the FPGA accelerator) expects. Put differently, the software interface on the host is consistent with the hardware interface on the FPGA. For example, if the number of network layers is changed from 6 to 12, without the consistency between the interfaces, the accelerator may only consume first 6 sets of an array of scaling values transmitting to the FPGA from the host when it should accept 12 sets.

The shared interface code 230 also includes a finite state machine (FSM) 320 for controlling the operations of the neural network accelerator on the FPGA. In one embodiment, the FSM 320, when executed on the FPGA, is a program that controls the accelerator using a plurality of assembly like instructions. However, instead of configuring the FSM 320 using hardware description language, a software developer can define the FSM 320 using high-level code (e.g., C++) which the compiler then changes into hardware description language. In one embodiment, the FSM 320 enables the FPGA to execute multiple neural network layers in parallel. For example, the FSM 320 may have multiple instructions, one for each neural network layer. When transferring data from the host to the FPGA, the FSM 320 can provide an integrated flow with low overhead.

A serialization technique 325 defines how the respective interfaces on the host and FPGA serialize data intended for the other computing system. For example, protocol buffers serialize structured data which enable programs (operating in the same computing systems or two homogeneous computing systems) to communicate with each other over a wire or for storing data. The serialization technique 325, in contrast, defines a method for serializing structured data transferred between two heterogeneous computing systems. In one embodiment, the serialization technique 325 receives structured data from the host or the FPGA (which may use different data structures) and generates a stream of bits or bytes which is transmitted using a wired connection (e.g., PCIe) to the other computing system.

A deserialization technique 330 defines how the respective interfaces on the host and FPGA deserialize data received from the other computing system. For example, the deserialization technique 330 takes serial data received from the host and converts it into a data structure used by the FPGA. Similarly, the deserialization technique 330 takes serial data received from the FPGA and converts it into a data structure used by the host, which can be different from the data structures used by the FPGA.

Figure 4:
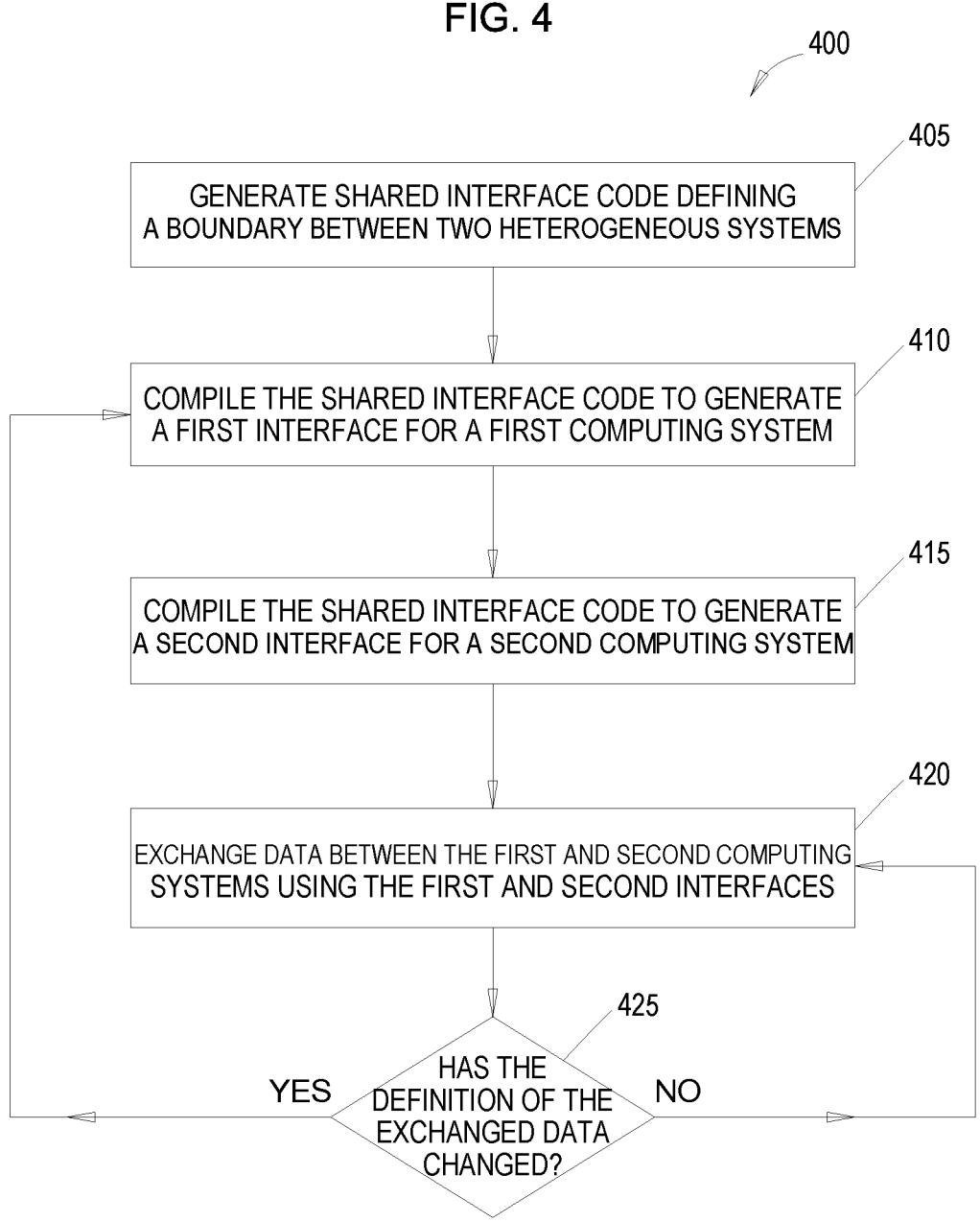
FIG. 4 is a flowchart for generating interfaces for two heterogeneous systems from shared interface code, according to an example.

FIG. 4 is a flowchart of a method 400 for generating interfaces for two heterogeneous systems from shared interface code, according to an example. At block 405, a software developer generates shared interface code defining a software-hardware boundary between two heterogeneous systems. Using FIG. 3 as an example, the shared interface code 230 includes data member definitions 305, the FSM 320, the serialization technique 325, and the deserialization technique 330 for defining respective interfaces for communicating between a host computing system and a FPGA. By changing the shared interface code 230 (e.g., adding or removing data members), the software developer can change the respective interfaces on the host and FPGA thereby defining a software-hardware boundary between the two systems.

At block 410, the compiler compiles the shared interface code to generate a first interface of the first computing system. In this example, it is assumed that the first computing system includes a general purpose processor for executing software applications. As such, the first interface may be implemented using object code generated by compiling the high-level shared interface code. In one embodiment, the first interface is a library which includes the necessary functions and data for enabling communication between the first and second computing systems.

At block 415, the compiler compiles the shared interface code (e.g., the same class compiled at block 410) to generate a second interface for the second computing system. The second computing system may be a specialized hardware system such as a FPGA, GPU, digital signal processor, etc. As such, rather than being implemented using object code, the second interface may be implemented using a hardware description language (e.g., RTL in the case of an FPGA).

In one embodiment, the second interface is implemented using a control unit in the FPGA. In one embodiment, the control unit can include a FSM that is configured according to the shared interface code. The control unit can generate control data for dictating the execution of the neural network layers in the accelerator. For example, the control unit may generate control values for performing im2col or scaling values when performing Max-pooling.

At block 420, the first and second computing systems exchange data using the first and second interfaces. The details on exchanging data using the interfaces generated from shared interface code are described in FIG. 6 below.

At block 425, a computing system determines whether the software developer has updated the shared interface code. For example, the software developer may add or remove data members in the shared interface code or modify the data or function of the data members. These modifications can change the software-hardware boundary between the first and second computing systems. In addition to changing the data member definitions, the software developer may also change the FSM or the serialization/deserialization techniques in the shared interface code.

When changed, the method 400 returns to block 410 where the compiler again compiles the shared interface code to update the first interface and at block 415 where the compiler updates the second interface. In this manner, the software developer can change the re-targetable class in the shared interface code which then changes how the two heterogeneous systems exchange data.

Figure 5:
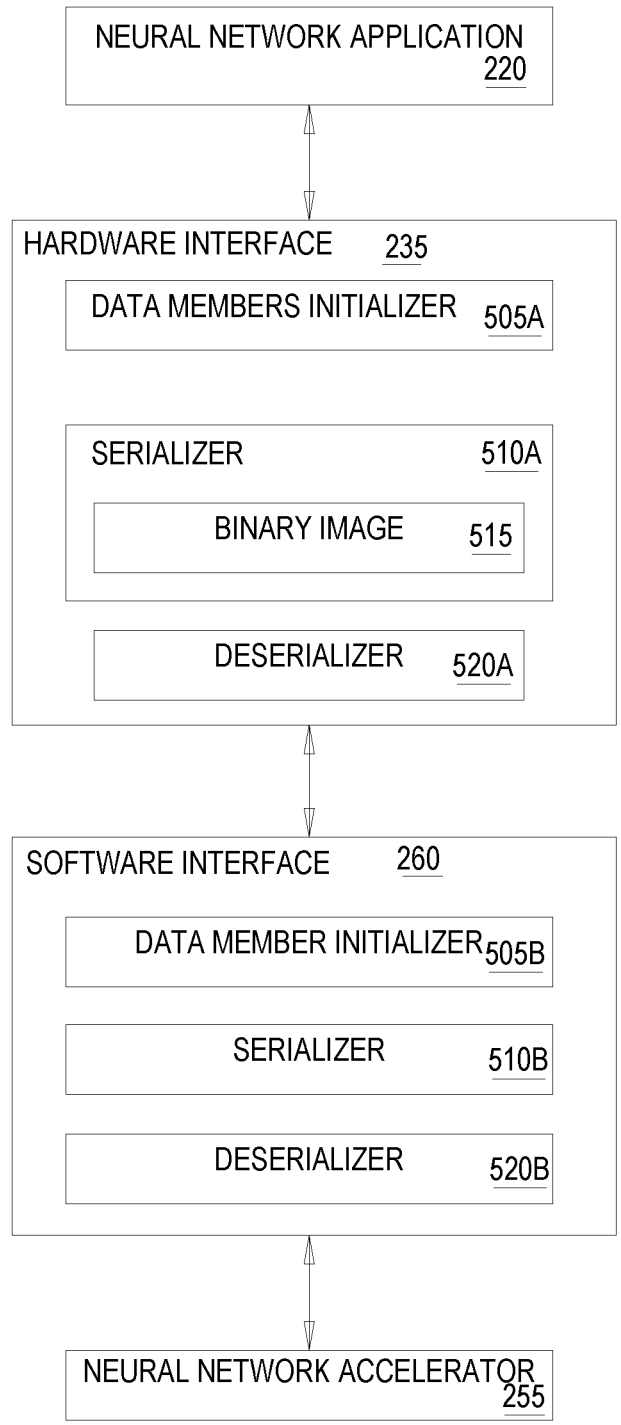
FIG. 5 is a communication flow between two heterogeneous systems, according to an example.

FIG. 5 is a communication flow 500 between two heterogeneous systems, according to an example. Specifically, the communication flow 500 illustrates how the hardware interface 235 and the software interface 260 facilitate communication between the neural network application 220 in the host and the neural network accelerator 255 in the FPGA. The flow 500 may start by the neural network application 220 identifying a task that it wants the neural network accelerator 255 to perform—e.g., executing one or more of the layers in the neural network, performing a convolution, performing max-pooling or ReLU functions, and the like.

The hardware interface 235 includes a data member initializer 505A, a serializer 510A, and a deserializer 520A which are generated by compiling the shared interface code. Although not shown, the hardware interface 235 may include other functional code modules that were not generated from the shared interface code such as a pipeline architecture for pipelining tasks sent to the accelerator 255 or a data conversion module for converting floating point data received from the neural network application 220 into a fixed point format.

The data member initializer 505A receives the data corresponding to the task from the neural network application 220 and initializes the corresponding data members. For example, if the task includes a scaling function, the data member initializer 505A selects the data member that performs this function or stores scaling values. Each task sent by the neural network application may use only a portion of the data members defined in the interface source code (which when compiled are stored in the hardware interface 235). The data member initializer 505A selects which data members are relevant to the task and uses the selected data members to process the data received from the neural network application 220.

The serializer 510A serializes the data received from the application 220 into a bit stream which is then transmitted to the FPGA. As shown, the serializer 510A includes a binary image 515 which represents the serialized data that is transmitted to the FPGA. The binary image 515 is then transmitted and stored in memory in the FPGA.

The hardware interface 235 also includes the deserializer 520A for converting serialized data from the software interface into a data structure which is then returned to the neural network application 220. Transmitting serial data between the host and FPGA reduces interface width (thus used hardware resources) as well as creates a data content-independent method for moving data compared to sending the data structures without serialization.

The software interface 260, like the hardware interface 235, includes a data member initializer 505B, a serializer 5106, and a deserializer 520B. These components perform a similar function as the ones in the hardware interface 235. When transmitting data from the FPGA to the host, the data member initializer 505B selects the relevant data members in the class that are used to process the data while the serializer 5106 serializes the processed data into a binary image which is then transmitted serially to the host. The deserializer 520B can deserializer the binary images received from the hardware interface 235 and convert the binary images into a data structure used by the neural network accelerator 255.

Figure 6:
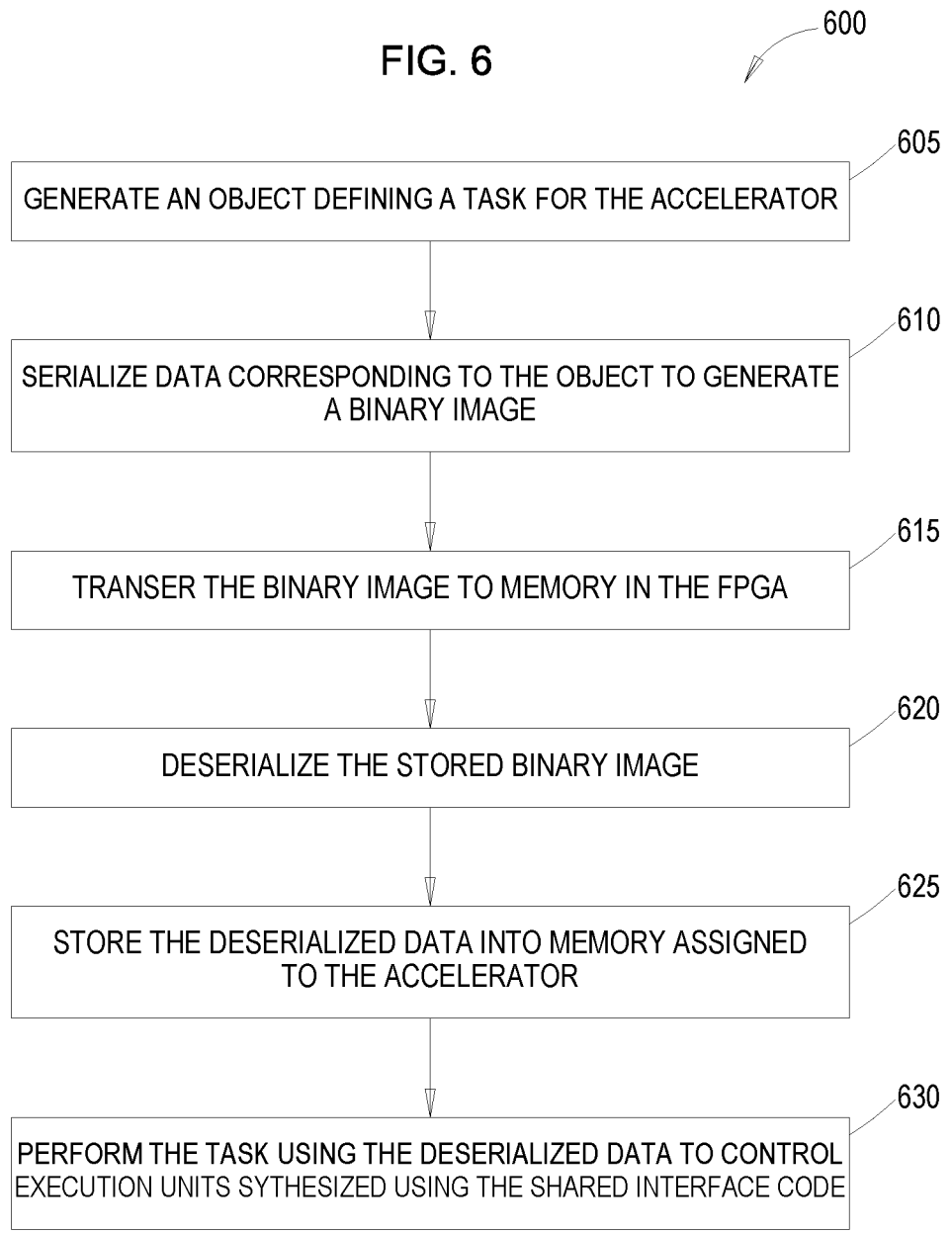
FIG. 6 is a flowchart for exchanging data between two heterogeneous systems using respective interfaces, according to an example.

FIG. 6 is a flowchart of a method 600 for exchanging data between two heterogeneous systems using respective interfaces, according to an example. For clarity, method 600 is described in parallel with FIG. 7 which is a system flow for exchanging data between two heterogeneous systems using respective interfaces.

Figure 7:
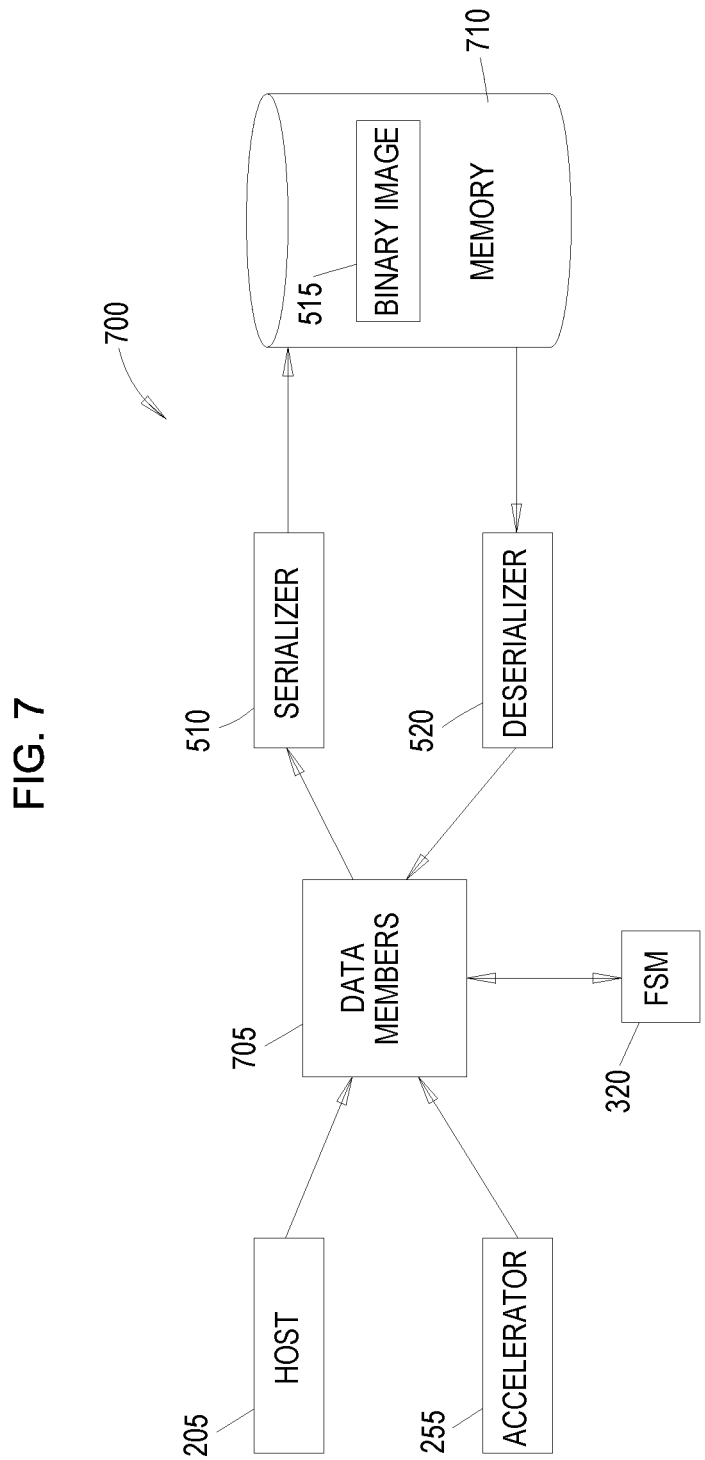
FIG. 7 is a system flow for exchanging data between two heterogeneous systems using respective interfaces, according to an example.

At block 605, the neural network application generates an object defining a task for the accelerator which is then transmitted to the hardware interface in the host. In addition, the neural network application may pass any call-specific values to the hardware interface which are used to initialize the data members in the hardware interface. This is represented in FIG. 7 where the host 205 can initialize the data members 705 in the hardware interface.

At block 610, after processing the received object using the data members 705, the serializer 510 in the hardware interface serializes the data provided by the data members. In one embodiment, the data is serialized as part of an object creation API. In another embodiment, the serializer 510 is explicitly called by the hardware interface. In either case, serializing data results in a binary image 515.

At block 615, the hardware interface transfers the binary image 515 to memory 710 in the FPGA. In one embodiment, the FPGA and the host are connected using a high-speed serial bus—e.g., PCIe. In one embodiment, the hardware interface may use an API that permits the host to control the FPGA and execute functions on the FPGA such as the neural network accelerator (or any other accelerator). The hardware interface can use the API to store the binary image into the memory 710 (e.g., DDR ram) in the FPGA.

At block 620, the deserializer 520 deserializes the binary image 515. In one embodiment, the deserialized data may be converted into one or more data structures that are preferred by the FPGA. For example, the FPGA may use BRAM or a set of individual registers to store an array of per-scaling values that on host are represented by a vector data structure.

At block 625, the FPGA stores the deserialized data into memory assigned to the accelerator. In one embodiment, the FPGA stores the deserialized data into registers and BRAM blocks in the FPGA which may be part of memory elements assigned to the neural network accelerator. For example, when transmitting the serialized data to the FPGA, the API in the hardware interface may initially store the binary image 515 in a portion of the memory 710 which is not assigned to the accelerator, but after being deserialized, the data is stored in memory assigned to the accelerator which will perform the task requested by the neural network application. Although the deserializer is described herein as being located in the software interface in the FPGA, in another embodiment a kernel in the FPGA, which can be software-defined, deserializes the binary image 515. In either case, the deserializer 520 may have been generated by compiling the shared interface code into corresponding RTL.

At block 630, the neural network accelerator performs the task using the deserialized data to control execution units synthesized using the shared interface code. That is, a kernel can use the data stored in the registers and BRAM blocks assigned to the neural network accelerator to control circuits that were synthesized from the shared interface code. In one embodiment, the control circuits are part of the FSM 320 which can enable the FPGA to execute multiple layers using different instructions.

To transmit data from the FPGA to the host, the method 600 can be modified such that the return of the processed data from FPGA to the host works the same way as described above in the host to FPGA direction, except that the serialization is now done on the FPGA by its software interface and deserialization by the host's hardware interface.

Figure 8:
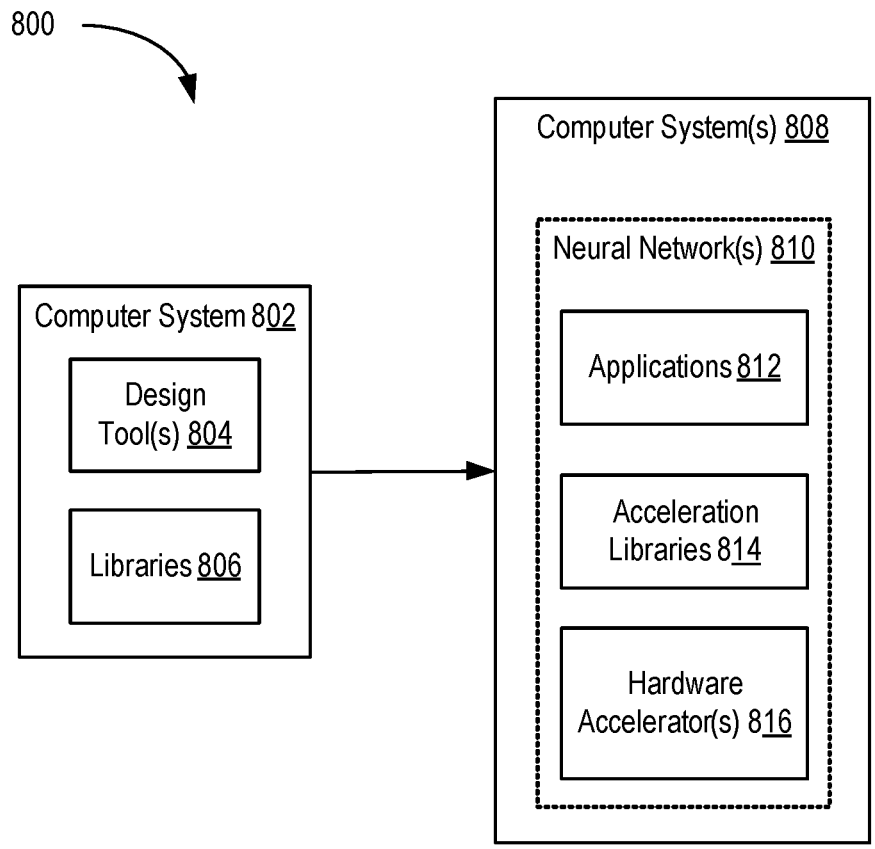
FIG. 8 is a block diagram depicting a system for implementing neural networks according to an example.

FIG. 8 is a block diagram depicting a system 800 for implementing neural networks according to an example. The system 800 includes a computer system 802 and one or more computer systems 808. The computer system 802 includes conventional computing components configured to execute software that provides one or more design tools 804. Each computer system 808 executes one or more neural networks 810 (as in any of the examples described above). The neural network(s) 810 are implemented using applications 812 (as in any of the examples described above), acceleration libraries 814 (as in any of the examples described above), and one or more hardware accelerators 816 (as in any of the examples described above).

In an example, the hardware accelerator(s) 816 include programmable ICs, such as FPGAs. The acceleration libraries 814 provide APIs to interface with the hardware accelerator(s) 816. The acceleration libraries 814 can also include libraries that provide neural network functions, including predefined and optimized implementations of neural network layers and other types of neural network structures. Thus, the neural network(s) 810 can include both hardware portions implemented in the hardware accelerator(s) 816, as well as software portions implemented in the acceleration libraries 814. The applications 812 invoke the APIs of the acceleration libraries 814 to program and control the hardware accelerator(s) 816 to implement the neural network(s) 816.

A designer interacts with the design tool(s) 804 to define the neural network(s) 810. The design tool(s) 804 can generate files for programming the hardware accelerator(s) 816 (e.g., configuration bit streams for FPGAs), files that provide the acceleration libraries 814, and files that provide the applications 812. The designer can define the hardware portions of the neural network(s) 810 using a register transfer language (RTL) or using a programming language, such as C, C++, OpenCL, and the like, or a combination of RTL and programmable language(s). The user can define the software portions of the neural network(s) 810 using a programming language, such as C, C++, OpenCL, etc. The design tool(s) 804 compile the software-defined neural networks to generate files for programming the hardware accelerator(s) 816 and library files for the acceleration libraries 814. The designer can make use of libraries 806 that provide class libraries, template libraries, and the like to assist in developing the hardware and software portions of the neural network(s) 810.

A user can define the applications 812 using a programming language (e.g., C, C++, Python, etc.). The user can make use of neural network frameworks and libraries, such as Caffe, TensorFlow, MXNet, and the like.

Figure 9:
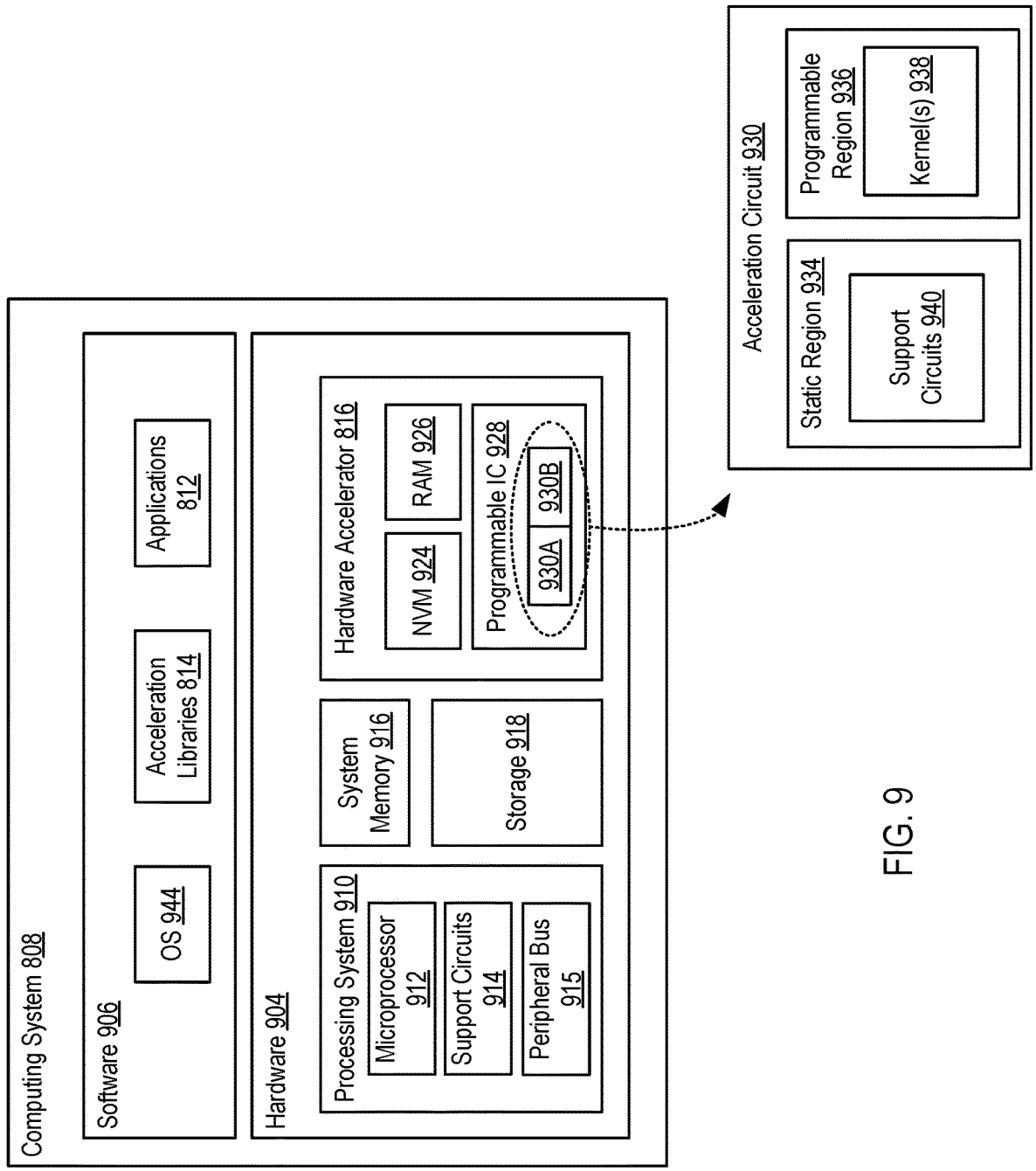
FIG. 9 is a block diagram depicting a computing system according to an example.

FIG. 9 is a block diagram depicting a computing system 808 according to an example. The computing system 808 includes hardware 904 and software 906 executing on the hardware 904. The hardware 904 includes a processing system 910, system memory 916, storage devices ("storage 918"), and a hardware accelerator 816. The software 906 includes an operating system (OS) 944, the acceleration libraries 814, and the applications 812.

The processing system 910 includes a microprocessor 912, support circuits 914, and a peripheral bus 915. The microprocessor 912 can be any type of general-purpose central processing unit (CPU), such as an x86-based processor, ARM®-based processor, or the like. The microprocessor 912 can include one or more cores and associated circuitry (e.g., cache memories, memory management units (MMUs), interrupt controllers, etc.). The microprocessor 912 is configured to execute program code that perform one or more operations described herein and which can be stored in the system memory 916 and/or the storage 918. The support circuits 914 include various devices that cooperate with the microprocessor 912 to manage data flow between the microprocessor 912, the system memory 916, the storage 918, the hardware accelerator 816, or any other peripheral device. For example, the support circuits 914 can include a chipset (e.g., a north bridge, south bridge, platform host controller, etc.), voltage regulators, firmware (e.g., a BIOS), and the like. The support circuits 914 manage data flow between the microprocessor 912 and the peripheral bus 915, to which various peripherals, such as the hardware accelerator 816, are connected. In some examples, the microprocessor 912 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 910 is shown separate from the hardware accelerator 816. In other examples discussed further below, the processing system 910 and the hardware accelerator 816 can be implemented on the same IC using a System-On-Chip (SoC).

The system memory 916 is a device allowing information, such as executable instructions and data, to be stored and retrieved. The system memory 916 can include, for example, one or more random access memory (RAM) modules, such as double-data rate (DDR) dynamic RAM (DRAM). The storage device 918 includes local storage devices (e.g., one or more hard disks, flash memory modules, solid state disks, and optical disks) and/or a storage interface that enables the computing system 808 to communicate with one or more network data storage systems. The hardware 904 can include various other conventional devices and peripherals of a computing system, such as graphics cards, universal serial bus (USB) interfaces, and the like.

The hardware accelerator 816 includes a programmable IC 928, a non-volatile memory 924, and RAM 926. The programmable IC 928 can be an FPGA or the like or a SoC having an FPGA or the like. The NVM 924 can include any type of non-volatile memory, such as flash memory or the like. The RAM 926 can include DDR DRAM or the like. The programmable IC 928 is coupled to the NVM 924 and the RAM 926. The programmable IC 928 is also coupled to the peripheral bus 915 of the processing system 910.

The OS 914 can be any commodity operating system known in the art, such as such as Linux®, Microsoft Windows®, Mac OS®, or the like. The acceleration libraries 814 include drivers and libraries that provide APIs for command and control of the hardware accelerator 816. The applications 812 include software executing on the microprocessor 912 that invokes the APIs of the acceleration libraries 814 to implement neural network(s).

In operation, the programmable IC 928 is configured with an acceleration circuit 930. In one example, the acceleration circuit 930 is the neural network accelerator 255 in FIG. 2 but the embodiments herein are not limited to such and may be other types of neural network accelerators or other types of hardware accelerators. The acceleration circuit 930 generally includes a base platform 930A and a kernel 930B. For example, the acceleration circuit 930 can be implemented using a static region 934 and a programmable region 936. The static region 934 includes support circuits 940 for providing an interface to the peripheral bus 915, the NVM 924, and the RAM 926. The programmable region 936 can include one or more kernel circuits ("kernel(s) 938"). The base platform 930A is implemented using the static region 934, and the kernel 930B is implemented using the programmable region 936. In another example, the base platform 930A can also be implemented using a portion of the programmable region 936. Thus, in some examples, the programmable region 936 also includes some interface circuits. In some examples, the acceleration circuit 930 can include more than one programmable region 936, each of which can be individually configured with kernel(s) 938.

The static region 934 is "static" in that the circuitry thereof remains constant across reconfigurations of the programmable region 936. In an example, the support circuits 940 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 936 does not include any of the support circuits 940. In other examples, some support circuits are implemented in the programmable region 936. In such case, the programmable region 936 can be referred to as an "expanded programmable region." In either case, in one example, some support circuits 940 are always present in the static region 934, such as the PCIe circuits and the DMA circuits.

Figure 10:
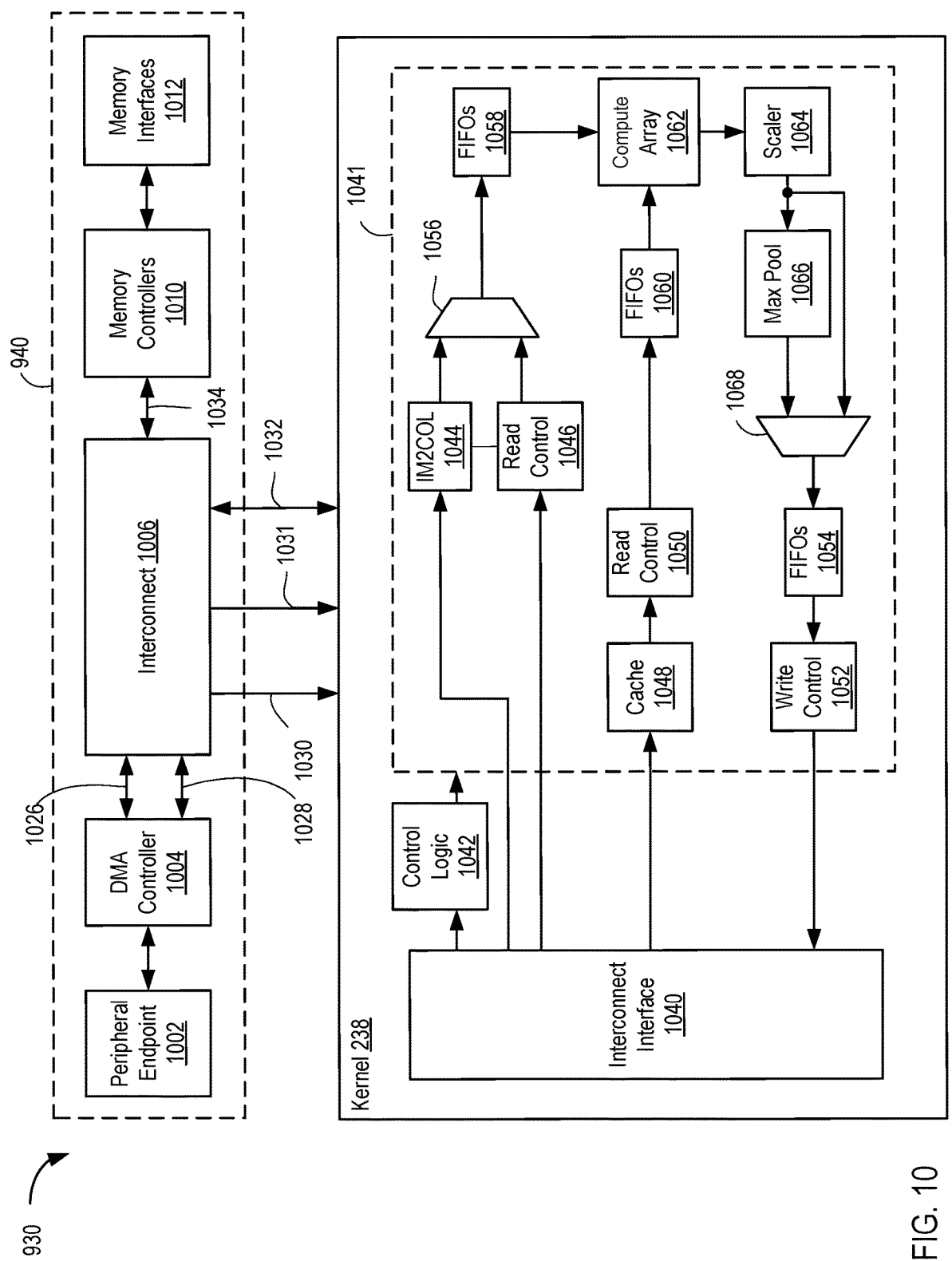
FIG. 10 is a block diagram depicting an acceleration circuit according to an example.

FIG. 10 is a block diagram depicting an acceleration circuit 930 according to an example. The acceleration circuit 930 includes the support circuits 940 and a kernel 938. In the example, the support circuits 940 include a PCIe endpoint circuit ("PCIe endpoint 1002"), a PCIe DMA controller 1004, interconnect circuits ("interconnect 1006"), memory controllers 1010, and memory interfaces 1012. The support circuits 940 can include other circuits, which are omitted for clarity (e.g., decoupler circuits, debug circuits, etc.). The PCIe endpoint 1002 provides a physical interface to the peripheral bus 915. The PCIe DMA controller 1004 facilitates DMA operations to the RAM 926 and the kernel 938. The interconnect 1006 couples the PCIe DMA controller 1004 to the memory controllers 1010 and to the kernel 938. The memory controllers 1010 are coupled to the memory interfaces 1012. The memory interfaces 1012 are coupled to the RAM 926.

In operation, the acceleration libraries 946 can access the RAM 926 directly through the PCIe DMA controller 1004. The acceleration libraries 946 can also access the kernel 938 through the PCIe DMA controller 1004. The kernel 938 can access the RAM 926 through the memory controllers 1010. Data can be exchanged between the software 906 and the kernel 938 using DMA operations between the system memory 916 and the RAM 926.

In the example, the kernel 938 uses interfaces 1030, 1031, and 1032 to communicate with the interconnect 1006. In particular, these interfaces may include a first read interface 1030, a second read interface 1031, and a read/write interface 1032. For example, the read interface 1030 can be used as a control interface for controlling the kernel 938. The read interface 1031 can be used to read from the RAM 926 through a first one of the memory interfaces 1012. The read/write interface 1032 can be used to read and write from the RAM 926 through a second one of the memory interfaces 1012.

The kernel 938 includes an interconnect interface 1040, control logic 1042, and processing circuits 1041. The processing circuits 1041 include an IM2COL circuit ("IM2COL 1044"), a read control circuit ("read control 1046"), a multiplexer 1056, first-in-first-out circuits ("FIFOs 1058"), compute array 1062, a scaler circuit ("scaler 1064"), a max pool circuit ("max pool 1066"), a multiplexer 1068, FIFOs 1054, write control circuit ("write control 1052"), a cache 1048, a read control circuit ("read control 1050"), and FIFOs 1060. The interconnect interface 1040 is coupled to the interfaces 1030, 1031, and 1032, the control logic 1042, and the processing circuits 1041. The interconnect interface 1040 can include switches, clock converters, and the like to facilitate communication between the control logic 1042 and the interface 1030, as well as between the processing circuits 1041 and the interfaces 1031 and 1032.

In the example, the interconnect interface 1040 is coupled to inputs of the IM2COL circuit 1044, the read control circuit 1046, the cache 1048, and the write control circuit 1052. Outputs of the IM2COL circuit 1044 and the read control circuit 1046 are coupled to inputs of the multiplexer 1056. An output of the multiplexer 1056 is coupled to an input of the FIFOs 1058. An output of the FIFOs 1058 is coupled to a first input of the compute array 1062. An output of the cache 1048 is coupled to an input of the read control circuit 1050. An output of the read control circuit 1050 is coupled to an input of the FIFOs 1060. An output of the FIFOs 1060 is coupled to a second input of the compute array 1062. An output of the compute array 1062 is coupled to an input of the scaler 1064. An output of the scaler 1064 is coupled to an input of the max pool circuit 1066 and an input of the multiplexer 1068. An output of the max pool circuit 1066 is coupled to another input of the multiplexer 1068. An output of the multiplexer 1068 is coupled to an input of the FIFOs 1054. An output of the FIFOs 1054 is coupled to the write control circuit 1052.

In operation, the compute array 1062 performs matrix multiplication operations for implementing a neural network. The inputs of the compute array 1062 receive input activation matrices from the FIFOs 1058 and weight matrices from the FIFOs 1060. The input activation matrices can be read directly from the RAM 926 using the read control circuit 1046. Alternatively, the input activations can be read from the RAM 926 and processed by the IM2COL circuit 1044 for input to the compute array 1062. Embodiments of the IM2COL circuit 1044 are described below. Weight matrices can be read from the RAM 926 by the read control circuit 1050 and cached in cache 1048. The scaler 1064 can scale the output of the compute array 1062. The max pool circuit 1066 can implement a max pooling function on the scaled output of the compute array 1062. In one example, the max pool circuit 966 is implemented using configurable logic blocks (CLBs) or other configurable logic. Either the output of the max pool circuit 1066 or the scaler 1064 can be stored in the FIFOs 1054. The write control circuit 1052 writes data in the FIFOs to the RAM 926. The control logic 1042 controls the various circuits in the processing circuits 1041, such as the IM2COL circuit 1044, the read control circuit 1046, the multiplexers 1056 and 1068, the read control circuit 1050, and the scaler 1064, the max pool circuit 1066, and the write control circuit 1052.

Figure 11:
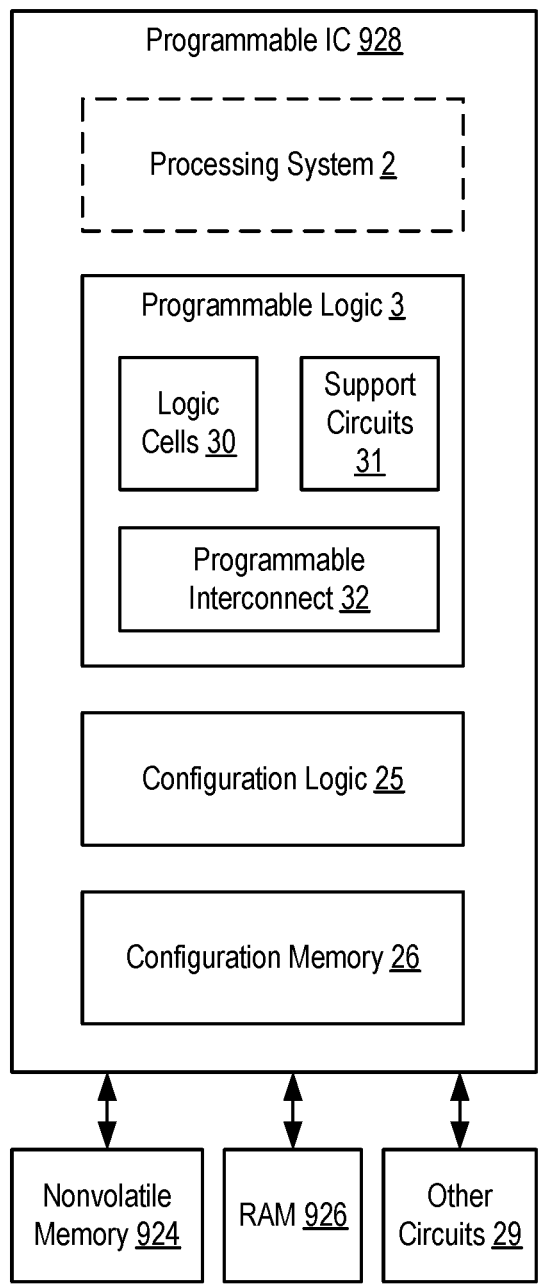
FIG. 11 is a block diagram depicting a programmable integrated circuit (IC) according to an example.

FIG. 11 is a block diagram depicting a programmable IC 928 according to an example. The programmable IC 928 includes programmable logic 3, configuration logic 25, and configuration memory 26. The programmable IC 928 can be coupled to external circuits, such as the NVM 924, the RAM 926, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 924 or any other source (e.g., the DRAM 28 or from the other circuits 29). In some examples, the programmable IC 928 includes a processing system 2. The processing system 2 can include microprocessor(s), memory, support circuits, IO circuits, and the like. For example, the processing system 2 can include circuits similar to the processing system 910. In some examples, the processing system 2 can be used in place of the processing system 910. In such case, the entire computing system 808 can be implemented using the programmable IC 928, where the software 906 executes on the processing system 2.

Figure 12:
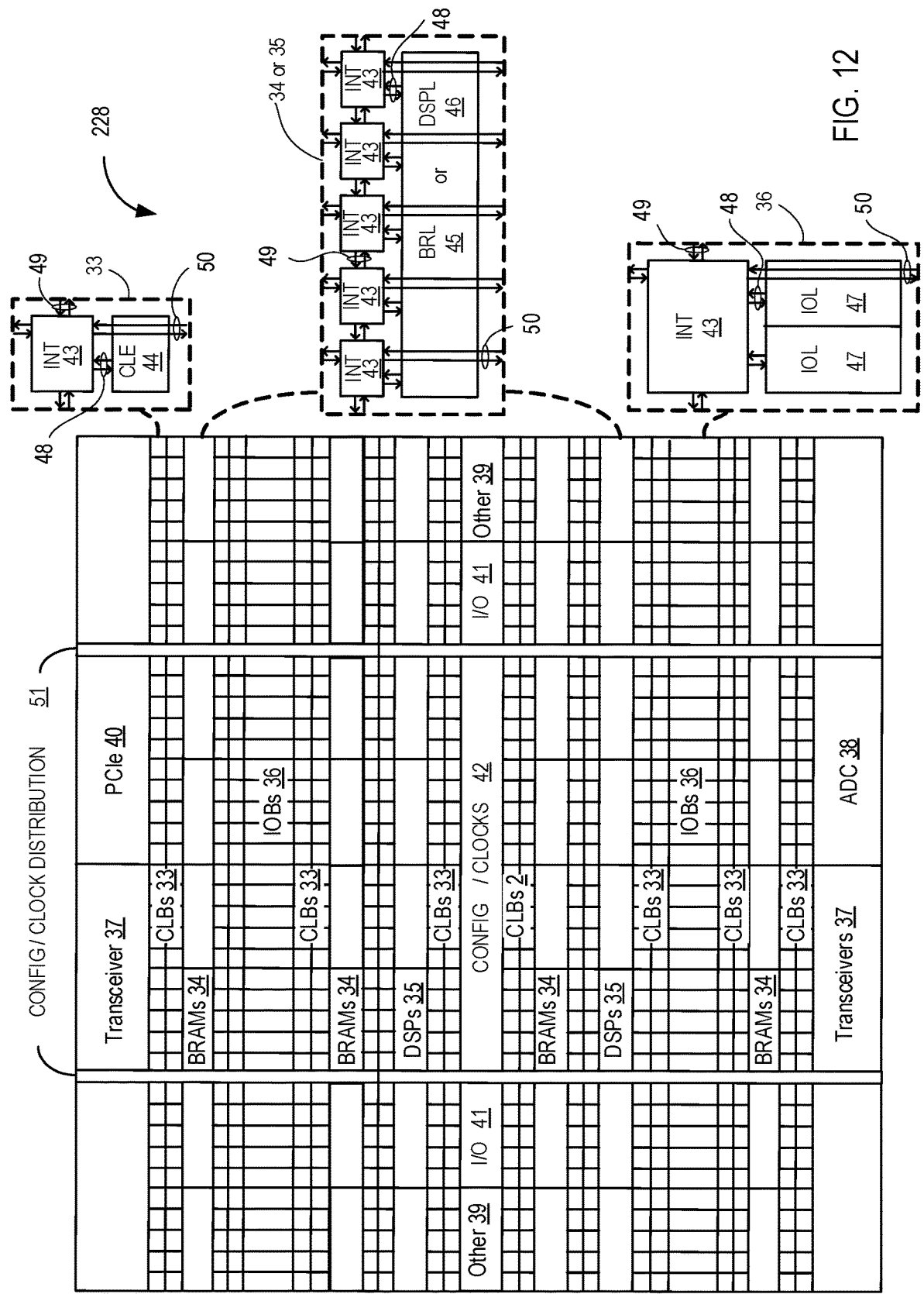
FIG. 12 illustrates a field programmable gate array (FPGA) implementation of a programmable IC according to an example.

FIG. 12 illustrates an FPGA implementation of the programmable IC 928 that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 12. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 12) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic.

Note that FIG. 12 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 12 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method of exchanging data between a plurality of heterogeneous systems, the method comprising:
receiving shared interface code comprising a data structure defining a software-hardware boundary between the plurality of heterogeneous computing systems;
compiling the shared interface code to generate a first interface for a first computing system of the plurality of heterogeneous computing systems;
compiling the shared interface code to generate a second interface for a second computing system of the plurality of heterogeneous computing systems; and
exchanging data between the first and second computing systems using the first interface executing in the first computing system and the second interface executing in the second computing system.

2. The method of claim 1, wherein the first interface is implemented using software code executed by a processor in the first computing system, wherein the second interface is implemented using a hardware description language that configures hardware elements in the second computing system.

3. The method of claim 2, wherein the processor in the first computing system is a central processing unit (CPU) and the second computing system comprises one of a field programmable gate array (FPGA) and a graphic processing unit (GPU).

4. The method of claim 1, wherein the shared interface code comprises a software class that defines data members for exchanging the data between the first and second computing systems.

5. The method of claim 4, wherein the software class is compiled to form both the first interface and the second interface.

6. The method of claim 1, further comprising:
receiving an update to the shared interface code that alters, relative to an initial assignment, which tasks are performed by a software application executing in the first computing system and which tasks are performed by hardware in the second computing system thereby changing the software-hardware boundary between the plurality of heterogeneous computing systems;
compiling the updated shared interface code to generate an updated first interface and an updated second interface; and
exchanging data between the first and second computing systems using the updated first and second interfaces.

7. The method of claim 1, wherein exchanging the data between the first and second computing systems comprises:
receiving an object from an application executing on the first computing system;
serializing data corresponding to the object to generate a binary image;
transmitting serially the binary image to the second computing system; and
deserializing the binary image at the second computing system.

8. The method of claim 1, wherein the first computing system includes a neural network application and the second computing system includes a neural network accelerator, wherein the shared interface code defines a finite state machine for controlling the neural network accelerator when processing tasks received from the neural network application.

9. A non-transitory computer-readable storage medium storing instructions, which when executed on one or more processing devices, perform an operation for exchanging data between a plurality of heterogeneous systems, the operation comprising:
receiving shared interface code comprising a data structure defining a software-hardware boundary between the plurality of heterogeneous computing systems;
compiling the shared interface code to generate a first interface for a first computing system of the plurality of heterogeneous computing systems;
compiling the shared interface code to generate a second interface for a second computing system of the plurality of heterogeneous computing systems; and
exchanging data between the first and second computing systems using the first interface executing in the first computing system and the second interface executing in the second computing system.

10. The computer-readable storage medium of claim 9, wherein the first interface is implemented using software code executed by a processor in the first computing system, wherein the second interface is implemented using a hardware description language that configures hardware elements in the second computing system.

11. The computer-readable storage medium of claim 10, wherein the processor in the first computing system is a CPU and the second computing system comprises one of a FPGA and a GPU.

12. The computer-readable storage medium of claim 9, wherein the shared interface code comprises a software class that defines data members for exchanging the data between the first and second computing systems.

13. The computer-readable storage medium of claim 12, wherein the software class is compiled to form both the first interface and the second interface.

14. The computer-readable storage medium of claim 12, wherein the operation further comprises:
receiving an update to the software class that at least one adds a first data member to the data members and removes a second data member from the data members thereby changing the software-hardware boundary between the plurality of heterogeneous computing systems;
compiling the updated software class to generate an updated first interface and an updated second interface; and
exchanging data between the first and second computing systems using the updated first and second interfaces.

15. The computer-readable storage medium of claim 9, wherein exchanging the data between the first and second computing systems comprises:
receiving an object from an application executing on the first computing system;
serializing data corresponding to the object to generate a binary image;
transmitting serially the binary image to the second computing system; and
deserializing the binary image at the second computing system.

16. A communication system, comprising:
a first computing system comprising a processor and a compiler, wherein the compiler is configured to:

receive shared interface code comprising a data structure defining a software-hardware boundary between a plurality of heterogeneous computing systems, compile the shared interface code to generate a first interface for the first computing system, and compile the shared interface code to generate a second interface for a second computing system of the plurality of heterogeneous computing systems, wherein the first and second computing systems are configured to exchange data using the first interface executing in the first computing system and the second interface executing in the second computing system.

17. The communication system of claim 16, wherein the first interface is implemented using software code executed by the processor in the first computing system, wherein the second interface is implemented using a hardware description language that configures hardware elements in the second computing system.

18. The communication system of claim 17, wherein the processor in the first computing system is a central processing unit (CPU) and the second computing system comprises one of a field programmable gate array (FPGA) and a graphic processing unit (GPU).

19. The communication system of claim 16, wherein the shared interface code comprises a software class that defines data members for exchanging the data between the first and second computing systems.

20. The communication system of claim 19, wherein the compiler is configured to:

receive an update to the software class that at least one adds a first data member to the data members and removes a second data member from the data members thereby changing the software-hardware boundary between the plurality of heterogeneous computing systems; and compile the updated software class to generate an updated first interface and an updated second interface, wherein the first and second computing systems exchange data using the updated first and second interfaces.

\* \* \* \* \*